Nov. 3, 1959
F. P. SCULLY
2,910,956
WHISTLE FOR SIGNALING DEVICE FOR USE IN FILLING TANKS
Filed Feb. 18, 1957
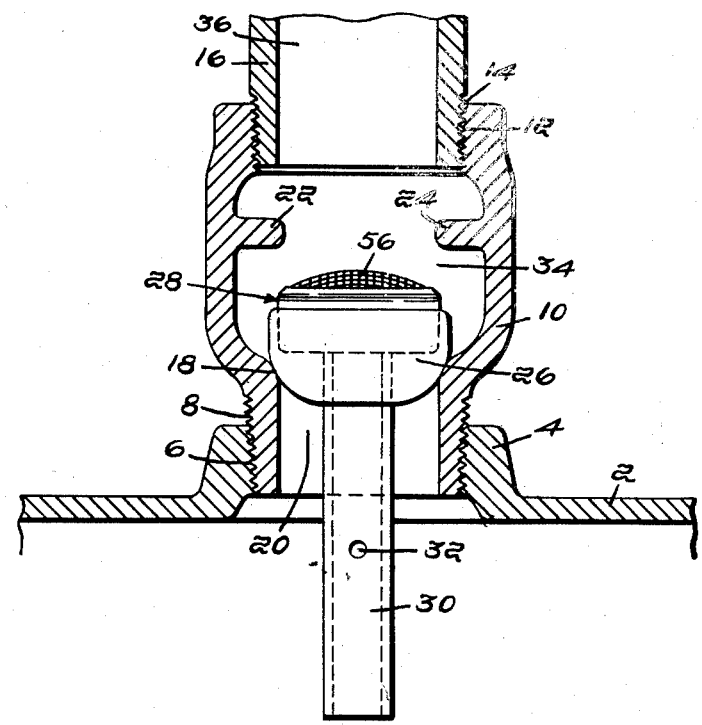
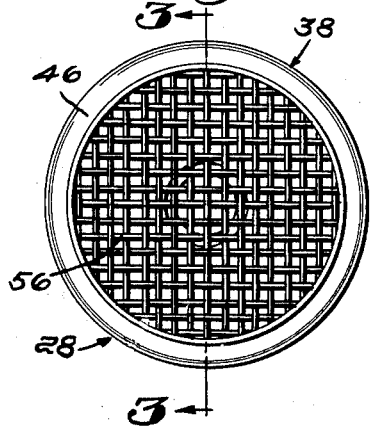
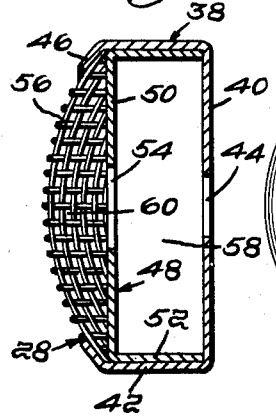
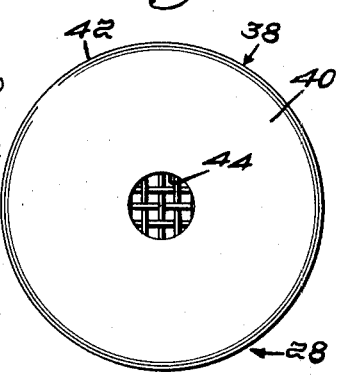
Inventor:
Frank P. Scully,
by Porter, Chittick & Russell
Attorneys

United States Patent Office 2,910,956
Patented Nov. 3, 1959

2,910,956

WHISTLE FOR SIGNALING DEVICE FOR USE IN FILLING TANKS

Frank P. Scully, Belmont, Mass., assignor to Scully Signal Company, Melrose, Mass., a corporation of Massachusetts Application February 18, 1957, Serial No. 640,965

2 Claims. (Cl. 116—109)

This invention relates to audible signaling devices of the type used in filling closed tanks.

It is now common practice in the fuel oil industry and particularly in connection with the filling of household fuel tanks to use an audible signaling device which advices the operator that the tank is being filled properly and gives an indication when the liquid level in the tank has risen to a desired predetermined point so that the operator will know that the supply should be discontinued.

Audible signaling devices of this type are installed in series with the tank and the vent pipe so that gas displaced in the tank by the entering liquid will pass through the signaling device on its way to the vent pipe and the outside atmosphere. A signaling device of the type in question is shown and described in the patent to Mathey No. 2,135,522 of November 8, 1938 for Liquid Level Indicator.

A more recent type of liquid level indicator which includes means for preventing insects or other foreign matter, animate or inanimate, from entering the whistle of the signaling device is shown in the patent to Mathey No. 2,716,389 of August 30, 1955.

The present invention which is a specie of the invention broadly claimed in Patent No. 2,716,389 provides a whistle in combination with new and improved means for preventing the entry of insects and other foreign matter into the whistle in a manner superior to that disclosed in the above last mentioned patent.

The construction shown in Patent No. 2,716,389 for preventing entry of insects into the interior of the whistle body has proved effective and satisfactory in use. Experience has shown, however, that insects small enough to pass by the barriers provided in this patent will on occasion enter the vent pipe and work their way into the whistle in such quantity as ultimately to render the whistle partially or completely inoperative. In other instances rust may accumulate in the vent pipe and subsequently be jarred loose to fall down on top of the whistle. Some of such rust particles may be small enough to pass the barriers to enter the whistle, thereby to render the device partially or completely inoperative.

As was further pointed out in Patent No. 2,716,389 the protective elements or barriers that are placed across the upper opening of the whistle must be small enough in cross sectional dimension so that the sound producing characteristics of the whistle will not be appreciably affected by the presence of the elements but still the elements should be placed as close together as possible to provide entering areas small enough to preclude the entrance into the whistle of insects. In other words, if, for example, very small mesh screening were placed directly on top of the upper whistle opening, the available area through which gas must pass would be so decreased that the whistle would fail to give the proper sound. Therefore, in the development of constructions in which the protective elements were positioned immediately above the upper whistle opening, the size, number and spacing of such elements was necessarily limited by the effect on the whistle sound.

Further experimentation has resulted in a new construction which is disclosed herein and which permits the use of a screen fine enough to keep out much smaller insects and particles of foreign matter than was possible with the construction of Patent No. 2,716,389 without affecting the whistle sound.

The principle on which the present invention operates which permits the whistle to sound in its normal unimpeded and maximum manner is this: The gas on passing through the second or upper whistle aperture is allowed to expand to reach its normal reduced pressure beyond the whistle before passing through the relatively fine screen. The total available area of the screen through which the gas passes is considerably in excess of the area of the upper whistle orifice and therefore, the screen, even though of fine mesh, offers no appreciable resistance to the flow of the volume of gas passing through the whistle. In this manner, the whistle sound is produced in an undiminished degree and at the same time the screening can be made of much finer mesh than would have been possible in the construction in which the screening or protective elements were laid directly on top of the upper whistle orifice thereby reducing the available area through which the gas passing through the whistle would have to flow.

Another object of the invention is the provision of a construction in which standard whistle construction may be utilized in mounting the screen in the manner aforesaid.

These and other objects of the invention will become more apparent as the description proceeds with the aid of the accompanying drawings in which Fig. 1 is a vertical section of a signaling unit inserted between the tank top and vent pipe with the whistle and depending tube shown in side elevation.

Fig. 2 is a plan view of the whistle alone.

Fig. 3 is a vertical section taken on the line 3—3 of Fig. 2.

Fig. 4 is a bottom view of the whistle shown in Fig. 2.

In the drawings, in Fig. 1, 2 represents a conventional fuel oil tank having a circular boss 4 threaded internally at 6 to receive corresponding exterior threads 8 on the lower end of a tubular housing 10.

The upper end of housing 10 is interiorly threaded at 12 to receive the exterior threads 14 on the lower end of a vent pipe 16.

A circular seat 18 is located at the upper end of the entrance 20 to the passage through the housing. A pair of stops 22 and 24 extend inwardly from the housing wall to prevent undue upward movement of the whistling unit now to be referred to. The whistling unit consists of a ball valve 26 which normally rests on the circular seat 18. Positioned in the upper end of the ball valve is a whistle 28 which includes therein the present invention. An intrusion tube 30 concentric with the ball valve and in series with the whistle depends from the lower end of the ball valve to extend downwardly into the tank a predetermined distance. The intrusion tube 30 has a fixed open port 32 at its side to permit further venting of the bank through said port after the lower end of the intrusion tube 30 has been sealed by rising liquid.

The operation of the signaling unit just described is fully explained in both of the aforementioned patents and need not be explained in further detail here except to point out briefly that as the tank is being filled, displaced gas passes upwardly through intrusion tube 30 thence through whistle 28 and out through vent pipe 16. If the pressure in the tank becomes excessive or if the tank should be filled completely and overflow commence, then the ball valve 26 will be forced upwardly from seat 18 to provide an enlarged relief passage around the ball valve 26 upwardly through the interior of housing 10 and thence to vent pipe 16.

From the foregoing it will be understood that there are two passages through the signaling unit. There is a first pasage commencing at 20 which is normally blocked by yieldable means in the form of ball valve 26 which passage leads into the housing interior at 34 and thence to the vent pipe passage 36.

A second passage through the signaling unit is by way of the intrusion tube 30 thence through the whistle 28 and finally back into the passage 34 where the gases going through the whistle may merge with other gas flowing through the first passage should the ball valve at that time be off its seat 18.

The whistle construction which is the subject of the present invention will now be described in detail. Whistle 28 is shown in the enlarged views of Figs. 2, 3 and 4 and this whistle may be substituted for whistle 22 shown in Patent No. 2,716,389.

As can be seen most plainly in Fig. 3, the whistle comprises a cylindrical cup shaped element 38 having a bottom 40 and exterior circular wall 42. Bottom 40 has therein a lower centrally positioned whistle opening 44 and at the upper end of wall 42 is a circular flange 46 shown partially turned inward.

In telescoped relation with cup shaped element 38 is an inverted cup shaped element 48 having top 50 and a cylindrical depending wall 52 which fits closely within the confines of wall 42. At the time elements 38 and 48 are initially fitted together, the flange 46 is in vertical position and constitutes an extension of wall 42.

The top 50 has therein an upper centrally located whistle opening 54 in axial alignment with intrusion tube 30 and lower opening 44. It will be noted that the upper opening 54 is of somewhat larger diameter than the lower opening 44 as this construction has been found to produce a better quality of whistling sound.

Above the top 50 is a screen 56 generally in the form of a segment of a sphere and of sufficiently fine mesh to prevent the entrance into the whistle of those small insects or other foreign matter which have been found to have bad effects on the whistling quality of the unit. This screen, circular at its outer edge and of proper dimension is fitted within the confines of flange 46 prior to the inward bending of the flange and thereafter is secured in place as shown in Figs. 2 and 3 by the inward bending of flange 46 in the manner shown. The flange 46 thus positoned acts to secure together the two sections of the whistle in proper position and also to maintain the screen in a position in which a large area thereof is spaced a substantial distance above the top 50 of the whistle.

From the foregoing description it is now believed clear that the gas in the tank, under the pressure caused by the entering liquid, is forced upwardly through intrusion tube 30, thence through lower whistle inlet opening 44 into the interior 58 and thence up and out through whistle exhaust opening 54. The gas on leaving opening 54 has full opportunity to spread out in the space 60 between the top 50 of the whistle and the underside of screen 56. In other words, the behavior of the flow of gas through the whistle to the expansion area 60 is the same as it would be if the screen 56 were not present and hence the screen has no effect whatsoever on the gas vibrations created during the passage of the gas through the whistle and which produces the whistling sound.

The total available area between the wires that constitute the screen 56 is much larger than the area of upper opening 54 and hence the gas arriving in space 60 may flow with negligible resistance through screen 56 into the upper area 34 of housing 10.

While in the form shown, screening 56 has been illustrated as a preferred form of protective element, still it will be understood that any other arrangement of suitable protective elements could be used with equal success provided, of course, the elements are secured to the whistle, are close enough together to prevent the entry of insects or other unwanted foreign matter and finally, are spaced sufficiently above the top 50 of the whistle to provide an area or space in which the gas coming through opening 54 may expand before passing through the protective elements to the upper housing space 34.

It is my intention to cover all changes and modifications of the example of the invention herein chosen for purposes of the disclosure which do not constitute departures from the spirit and scope of the invention.

I claim:

1. A liquid level indicator for use in connection with the filling of a closed tank in which said tank has a plurality of openings in its top, one of which is a vent opening, said indicator comprising a casing adapted to be placed in series with said tank and vent opening and including a plurality of passages therethrough for the escape of gaseous fluid from the tank, yieldable means restricting one of said passages and being responsive to pressure within said tank, a second of said passages of less capacity than said one passage and including a whistle as an integral part of said second passage, having upper and lower spaced sides with aligned openings therein forming respectively whistle exhaust and inlet openings, a plurality of closely spaced protective elements secured to said whistle and positioned above and away from said exhaust opening thereby to provide an expansion space between said exhaust opening and said elements larger than said exhaust opening, the open area between said protective elements through which fluid may flow on leaving said expansion space being greater than the area of said exhaust opening whereby the resistance to flow through said protective elements is less than that through said exhaust opening, said open area between said spaced protective elements providing for flow of fluid from said expansion space into the passage that is restricted by said yieldable means.

2. A liquid level indicator for use in connection with the filling of a closed tank in which said tank has a plurality of openings in its top, one of which is a vent opening, said indicator comprising a casing adapted to be placed in series with said tank and vent opening and including a plurality of passages therethrough for the escape of gaseous fluid from the tank, yieldable means restricting one of said passages and being responsive to pressure within said tank, a second one of said passages of less capacity than said one passage and including a whistle as an integral part of said second passage, having upper and lower spaced sides with aligned openings therein, the opening in said lower side being a fluid inlet opening and the opening in said upper side being an exhaust opening, a perforate member secured to said whistle and positioned above and away from said exhaust opening thereby to provide an expansion space between said exhaust opening and said perforate member larger than said exhaust opening, the open area of said perforate member through which fluid may flow on leaving said expansion space being greater than the area of said exhaust opening whereby the resistance to flow through said perforate member is less than that through said exhaust opening, said open area of said perforate member providing for flow of fluid from said expansion space into the passage that is restricted by said yieldable means.

References Cited in the file of this patent

UNITED STATES PATENTS

| 2,091,044 | Hewitt | Aug. 24, 1937 |
| 2,299,447 | Wood | Oct. 20, 1942 |
| 2,689,543 | Lemmon | Sept. 21, 1954 |
| 2,709,577 | Pohndorf | May 31, 1955 |
| 2,716,389 | Mathey | May 31, 1955 |
| 2,753,831 | Davies | July 10, 1956 |
| 2,777,416 | Messick | Jan. 15, 1957 |